(12) United States Patent
Alagna et al.

(10) Patent No.: US 7,509,679 B2
(45) Date of Patent: *Mar. 24, 2009

(54) METHOD, SYSTEM AND COMPUTER PROGRAM PRODUCT FOR SECURITY IN A GLOBAL COMPUTER NETWORK TRANSACTION

(75) Inventors: Michael Anthony Alagna, Austin, TX (US); Mark Eric Obrecht, Austin, TX (US); Charles Andrew Payne, Austin, TX (US); Peter Norwood, Austin, TX (US)

(73) Assignee: Symantec Corporation, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/768,862

(22) Filed: Jan. 30, 2004

(65) Prior Publication Data

US 2004/0187023 A1    Sep. 23, 2004

Related U.S. Application Data

(63) Continuation-in-part of application No. 10/647,644, filed on Aug. 25, 2003, and a continuation-in-part of application No. 10/357,868, filed on Feb. 4, 2003, which is a continuation-in-part of application No. 10/231,557, filed on Aug. 30, 2002.

(51) Int. Cl.
*G06F 21/22*   (2006.01)
*G06F 15/16*   (2006.01)
*G06Q 30/00*   (2006.01)

(52) U.S. Cl. .......................................... 726/24; 705/75

(58) Field of Classification Search ................ 713/200, 713/201, 188; 345/531; 380/201; 705/44; 707/200
See application file for complete search history.

(56) References Cited

U.S. PATENT DOCUMENTS

| | | | |
|---|---|---|---|
| 5,121,345 A * | 6/1992 | Lentz | 713/188 |
| 5,398,196 A | 3/1995 | Chambers | |
| 5,440,723 A | 8/1995 | Arnold et al. | |
| 5,537,540 A | 7/1996 | Miller et al. | |
| 5,802,277 A | 9/1998 | Cowlard | |
| 5,919,257 A * | 7/1999 | Trostle | 713/200 |
| 5,956,481 A * | 9/1999 | Walsh et al. | 713/200 |
| 6,088,804 A * | 7/2000 | Hill et al. | 713/201 |
| 6,182,227 B1 | 1/2001 | Blair et al. | |

(Continued)

FOREIGN PATENT DOCUMENTS

WO    99/00720 A    1/1999

(Continued)

OTHER PUBLICATIONS

Office Action cited in U.S. Appl. No. 10/647,644, dated Aug. 10, 2007.

(Continued)

*Primary Examiner*—Christopher A Revak
(74) *Attorney, Agent, or Firm*—Meyertons Hood Kivlin Kowert & Goetzel, P.C.

(57) ABSTRACT

From a first information handling system ("IHS") to a second IHS, in response to a request for initiating an online transaction, a program is downloaded for detecting malicious code on the second IHS.

36 Claims, 3 Drawing Sheets

U.S. PATENT DOCUMENTS

| | | | |
|---|---|---|---|
| 6,266,774 B1 * | 7/2001 | Sampath et al. | 713/201 |
| 6,269,456 B1 * | 7/2001 | Hodges et al. | 714/38 |
| 6,272,641 B1 | 8/2001 | Ji | |
| 6,298,445 B1 * | 10/2001 | Shostack et al. | 726/25 |
| 6,330,588 B1 | 12/2001 | Freeman | |
| 6,357,008 B1 | 3/2002 | Nachenberg | |
| 6,393,568 B1 | 5/2002 | Ranger et al. | |
| 6,477,651 B1 * | 11/2002 | Teal | 726/23 |
| 6,523,120 B1 | 2/2003 | Strasnick | |
| 6,560,632 B1 | 5/2003 | Chess et al. | |
| 6,671,812 B1 * | 12/2003 | Balasubramaniam et al. | 713/201 |
| 6,725,377 B1 * | 4/2004 | Kouznetsov | 726/23 |
| 6,772,346 B1 * | 8/2004 | Chess et al. | 716/13 |
| 6,775,780 B1 * | 8/2004 | Muttik | 726/24 |
| 6,802,028 B1 | 10/2004 | Ruff et al. | |
| 6,842,861 B1 * | 1/2005 | Cox et al. | 713/188 |
| 6,973,577 B1 | 12/2005 | Kouznetsov | |
| 7,043,641 B1 * | 5/2006 | Martinek et al. | 713/187 |
| 7,116,782 B2 * | 10/2006 | Jackson et al. | 380/251 |
| 7,165,174 B1 * | 1/2007 | Ginter et al. | 713/153 |
| 7,203,841 B2 * | 4/2007 | Jackson et al. | 713/187 |
| 2002/0010640 A1 * | 1/2002 | Dutta et al. | 705/26 |
| 2002/0019767 A1 * | 2/2002 | Babbitt et al. | 705/12 |
| 2002/0066024 A1 | 5/2002 | Schmall et al. | |
| 2002/0116635 A1 * | 8/2002 | Sheymov | 713/200 |
| 2002/0150243 A1 * | 10/2002 | Craft et al. | 380/201 |
| 2002/0174137 A1 | 11/2002 | Wolff et al. | |
| 2003/0033536 A1 | 2/2003 | Pak et al. | |
| 2003/0149888 A1 * | 8/2003 | Yadav | 713/200 |
| 2003/0159070 A1 * | 8/2003 | Mayer et al. | 713/201 |
| 2003/0174137 A1 * | 9/2003 | Leung et al. | 345/531 |
| 2003/0177397 A1 * | 9/2003 | Samman | 713/201 |
| 2004/0054917 A1 | 3/2004 | Obrecht et al. | |
| 2004/0064736 A1 | 4/2004 | Obrecht et al. | |
| 2004/0098607 A1 | 5/2004 | Alagna et al. | |
| 2004/0123157 A1 | 6/2004 | Alagna et al. | |
| 2004/0187010 A1 * | 9/2004 | Anderson et al. | 713/188 |
| 2005/0137980 A1 | 6/2005 | Bullock et al. | |

FOREIGN PATENT DOCUMENTS

| | | |
|---|---|---|
| WO | 99/50734 A | 10/1999 |
| WO | WO 02/03178 | 1/2002 |
| WO | WO 02/103533 | 12/2002 |
| WO | WO 2004/021197 | 3/2004 |
| WO | WO 2004/055632 | 7/2004 |
| WO | WO 2004/072777 | 8/2004 |

OTHER PUBLICATIONS

Veldman, Frans, "Combating Viruses Heuristically," Virus Bulletin Conference, Virus Bulletin Ltd., Abington, GB, Sep. 1993, pp. 67-75, XP000828110.

Nachenberg, Carey, "Behavior Blocking: The Next Step in Anti-Virus Protection," http://www.securityfocus.com/infocus/1557, retrieved Jul. 25, 2007, pp. 1-5, XP002444153.

"Automated Program Analysis for Computer Virus Detection," IBM Technical Disclosure Bulletin, IBM Corp., New York, US, vol. 34, No. 2, Jul. 1, 1991, pp. 415-416, XP000211158, ISSN: 0018-8689.

Supplemental European Search Report mailed Aug. 6, 2007, cited in European Application No. 03791906.5.

Communication Pursuant to Article 94(3) EPC in Application No. EP 04 707 408.3 issued Jun. 2, 2008, 6 pages.

PCT Search Report, PCT No. PCT/US01/17275, Jan. 10, 2002, 4 pages.

* cited by examiner

METHOD, SYSTEM AND COMPUTER PROGRAM PRODUCT FOR SECURITY IN A GLOBAL COMPUTER NETWORK TRANSACTION

CROSS-REFERENCE TO RELATED APPLICATIONS

This application claims priority to and is a continuation-in-part of co-owned co-pending: (a) U.S. patent application Ser. No. 10/357,868, filed Feb. 4, 2003, by Alagna et al., entitled "METHOD, COMPUTER SOFTWARE, AND SYSTEM FOR PROVIDING END TO END SECURITY PROTECTION OF AN ONLINE TRANSACTION"; and (b) U.S. patent application Ser. No. 10/647,644, filed Aug. 25, 2003, by Obrecht et al., entitled "METHOD AND APPARATUS FOR DETECTING MALICIOUS CODE IN AN INFORMATION HANDLING SYSTEM." Each of these co-pending applications is a continuation-in-part of co-owned co-pending U.S. patent application Ser. No. 10/231,557, filed Aug. 30, 2002, by Obrecht et al., entitled "METHOD AND APPARATUS FOR DETECTING MALICIOUS CODE IN THE FORM OF A TROJAN HORSE IN AN INFORMATION HANDLING SYSTEM." Each of these co-pending applications is incorporated herein by reference in its entirety.

BACKGROUND

The present disclosure relates in general to information handling systems, and in particular to a method, system and computer program product for security in a global computer network transaction ("online transaction"). A Transport Control Protocol/Internet Protocol ("TCP/IP") network, such as the Internet, is an example of a global computer network. While performing an online transaction, a user may be subject to various security risks. Such risks cause various problems, including potential financial loss.

SUMMARY

From a first information handling system ("IHS") to a second IHS, in response to a request for initiating an online transaction, a program is downloaded for detecting malicious code on the second IHS.

DETAILED DESCRIPTION

Figure 1:
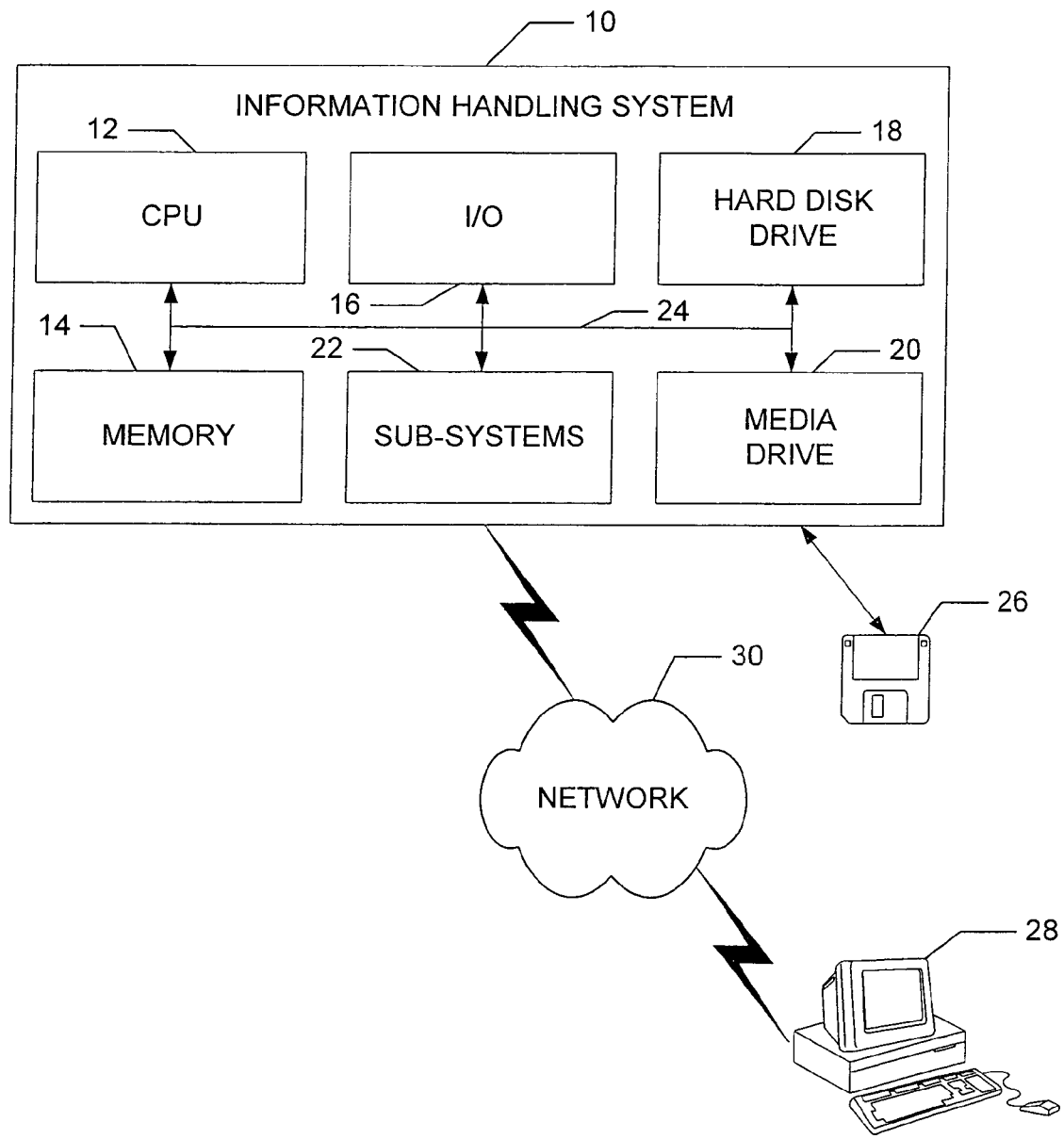
FIG. 1 is a system block diagram of an information handling system for online security according to one embodiment of the present disclosure.

FIG. 1 is a system block diagram of an information handling system 10 (or "computer", "computer system", or "machine") for online security, according to one embodiment of the present disclosure.

In performing an online transaction, a user may be subject to various security risks (e.g., identity theft or fraud ("online theft")). Such risks may harm the user and other entities (e.g., a bank or an online merchant) in the transaction. For example, the user may be subject to the security risks if the user's information handling system is infected with malicious code.

Malicious code is computer software code that is executed by an information handling system and can be used for malicious purposes, such as damaging, altering or using the system without permission or knowledge of the system's owner or user, even if the code also has legitimate purposes. Although the present disclosure describes some of the most common forms of malicious code, the present disclosure relates to all forms of malicious code.

For example, a remote control program can be used by a system administrator to perform legitimate operations on another user's computer, but the remote control program may nevertheless be considered malicious code, because it can also be used for malicious purposes. Code is embodied in the form of one or more executable instructions and/or their associated operands for an information handling system ("programs" or "computer programs"), according to a variety of techniques, such as an independent program, a library, a thread, a routine or subroutine, or an operating system component, any of which can be written in any computer programming language (e.g., scripting languages, interpreted languages, compiled languages, assembly languages or machine code).

Malicious code is stored in any computer-readable medium, such as a hard disk drive, floppy diskette, CD-ROM, DVD or memory. During operation of an information handling system, malicious code has one or more states, such as active, inactive, executing (or "running"), not executing, hidden or visible. In the illustrative embodiments, the malicious code detection program is operable to detect malicious code, irrespective of the malicious code's states, and irrespective of the computer-readable media storing the malicious code.

Trojan horses ("trojans") are a particular type of malicious code. The trojan is executable code that exists in a variety of different forms. For example, some (but not all) forms of trojans are instantiated in executable code as one or more programs, threads inside other programs, plugins or shared modules loaded by other programs, or modules loaded into operating system kernel memory in the manner of a device driver or loadable kernel module. A trojan is a form of malicious code that enables a person to remotely control someone else's computer. The person who remotely controls the computer is known as the "Evil Hacker" (or "hacker") while the person whose computer is being remotely controlled is known as the "Innocent Victim" (or "victim"). BackOrifice2000, SubSeven, NetBus and OptixPro are all examples of trojans. Trojans are sometimes referred to as "back-doors" or "hacker back-doors."

Most trojans have two components, the client program (trojan client) that is executed by the evil hacker's computer and the server program (trojan server) that is executed by the innocent victim's computer. Some trojans have only a trojan server that can be remotely controlled through manually entered commands rather than through the programmatic interface of a trojan client.

There are many ways to infect a computer with a trojan including sending the innocent victim the trojan server disguised as a valid program, copying the trojan server onto the innocent victim's computer, or exploiting a vulnerability in the innocent victim's computer to place the trojan server on the computer.

Several techniques exist that are effective for detecting some forms of malicious code. For example, some types of malicious code can be detected by examining the binary code image of the program during its execution or the binary code image of the program when it is stored on a storage device.

Many malicious code programs can be identified by a unique bit or byte pattern. The unique bit or byte pattern can include the entire image of the program while it is stored in memory or while it is stored on disk. The signature can also be a bit or byte pattern that is a portion of the program in memory or on disk. Once the unique sequence has been identified, a signature can be developed to identify the sequence. The signature is often the bit or byte pattern itself or it is in the form of a checksum. A detection program can then search for a malicious code program using the signature to identify the unique bit or byte sequence. Trojans, however, may be configurable to have no easily identifiable signature. Trojans may have configuration parameters that change the bit or byte sequences in the program and make it difficult or impossible to provide a unique signature. Various tools can be used to reconfigure a trojan, so that it will not have a known signature.

Another technique used to identify trojans examines the behavior of a trojan server while the trojan server is loaded and installed on a computer. With such a technique, a loaded and installed program is first placed into a sandbox, which includes a restricted area on the computer where the program (e.g., trojan server) can be examined safely. While such an approach may be effective for preventing some trojan infection, the approach does not however detect trojan servers once they are already installed on a computer. Such an approach does not detect many trojan servers because trojans do not exhibit their most characteristic behaviors while they are being loaded or installed, but rather they come alive and exhibit their malicious behavior after they have been loaded and installed.

Remote control software ("remote control"), such as pcAnywhere and VNC, is another type of malicious code, which has much of the same functionality as trojans. These programs allow for remote administration (via a "client" on a host personal computer ("PC")) of a target PC that is executing the "server" portion of the program. A goal of a trojan is to be stealth and transparent to the innocent victim, so as to remotely control the PC or other machine. By comparison, a goal of remote controls is to allow a trusted remote user to administer the machine for efficiency purposes. Nevertheless, remote controls can also be used by an evil hacker to remotely control a machine that is "infected" by the unauthorized remote control, in a stealthy and malicious manner. Moreover, even if a remote control is operated by a trusted legitimate user, the remote control can also be used by malicious individuals if proper security precautions are not taken (e.g., password protection, authentication, encryption). Accordingly, remote controls can be used for malicious purposes, so the present disclosure relates to them as well.

Keystroke loggers ("keyloggers" or alternatively "keyboard loggers") are another type of malicious code. The keylogger is executable code that can exist in one of many forms. For example, some forms of keyloggers can be instantiated in executable code as one or more programs, computer files, threads inside other programs, plugins or shared modules loaded by other programs, or modules loaded into operating system kernel memory in the manner of a device driver or loadable kernel module. A keylogger is a form of malicious code that enables a person to obtain the actual "punched" keystrokes from an infected computer. A record of the keystrokes usually exists in the form of a file on the file system, which stores the "punch for punch" results of what was typed at the keyboard. Also, some keyloggers provide capability for e-mailing (to an e-mail address) a record of the captured keystrokes, in order to share access and remotely identify the typed characters. Alternate access mediums are sometimes used for obtaining a record of the keystrokes, such as physical access to the infected system, e-mailing a file to a configured e-mail account, or "backdoor" access to the machine via a trojan. Sinred, Fearless KeySpy, and TeeJayEm KeySpy are examples of keyloggers. Typically, a keylogger is a software application (e.g., which may be, but is not necessarily, a standalone application) that exists in a machine's operating system.

Monitoring software is another type of malicious code, which has many similarities to keyloggers. In many respects, monitoring software performs operations that are similar to a keylogger. Monitoring software is often used to monitor a wide range of the computer's activity. For example, monitoring software is useful for a person to obtain a recorded log of actions that children, a spouse, friends, co-workers and others perform on their computers. Unlike keyloggers, monitoring software is often, but not always, purchased from a software vendor and installed by the computer's owner to achieve a new layer of surveillance over the computer owner's machine.

Spyware is an Internet term for advertising supported software ("adware"). Spyware differs from other malicious code, because spyware has legitimate purposes, in addition to potentially malicious purposes. Spyware is installed in a computer, according to a variety of techniques. Spyware's primary purpose is the gathering of marketing and statistical information about a user's electronic behavior, together with the reporting of such information via the infected machine's Internet connection to one or more collection servers via the Internet. According to the privacy policies of many advertising companies that develop and distribute spyware, no sensitive information (or other information that identifies the individual user) is authorized to be collected from the user's computer. Such a policy is helpful to allay possible concerns regarding invasion of privacy or malicious purpose. Nevertheless, such policies are not always adopted or followed. Many spyware examples contain a "live" server program executed by the machine, which is capable of sending personal information and web-surfing habits to a remote location. Accordingly, spyware is also covered by the present disclosure, because spyware can be used for malicious purposes.

Spyware has resulted in congestion of Internet web pages, as an increasingly large number of vendors create and distribute spyware via Internet sites that attract visitors. Spyware has also become a popular technique for shareware authors to profit from a product, other than by selling it directly to users. For example, if a user prefers, it can freely install an application bundled with spyware, instead of purchasing a license to the application. Several large media companies offer to place banner advertisements in software products, in exchange for a portion of revenue from sales resulting from the software products' display of the banner. This technique has increased in popularity, because users can avoid paying for the software products, and the software product developers receive money from alternate sources. If the user is annoyed by the banners, the user is usually given an option to remove them by paying a regular licensing fee for the software products.

Spyware is not illegal, but it raises various privacy issues for certain users. Such privacy issues are raised when the spyware tracks and sends information and statistics via a private Internet connection that operates in the "background" of the user's PC, using a server program that is installed on the user's PC. In a written privacy statement, legitimate adware companies will disclose the nature of such information that is collected and transmitted, but the user is typically unable to actually control it.

Worms are another type of malicious code that exists in a variety of different forms. For example, some (but not all) forms of worms are instantiated in executable code as one or more programs, computer files, threads inside other programs, plugins or shared modules loaded by other programs, or modules loaded into operating system kernel memory in the manner of a device driver or loadable kernel module. Worms are distributed ("spread") via a computer network, such as the Internet. From the computer network, they penetrate a computer's memory, calculate network addresses of other computers, and send copies of themselves to such addresses for additional replication. Worms often exploit OS, application or service vulnerabilities to propagate themselves and penetrate remote machines. Worms have various purposes, designs, propagation media, and techniques for exploiting vulnerabilities. On the machine, worms may deposit a "payload," which performs some or no operation. Frequently, this payload includes a trojan or keylogger. Examples of worms are Code Red and Sircam. Worms are convenient vehicles for evil hackers to distribute other types of malicious code.

Viruses are another type of malicious code that can exist in a variety of different forms, such as macro viruses, boot sector viruses, and parasitic viruses. For example, some (but not all) forms of viruses are instantiated in executable code are as one or more programs, computer files, threads inside other programs, plugins or shared modules loaded by other programs, or modules loaded into operating system kernel memory in the manner of a device driver or loadable kernel module. Some viruses merely replicate by inserting (or attaching) themselves to a medium, in order to infect another program, boot sector, partition sector, or document that supports macros. But many viruses additionally inflict a large amount of damage on the machine. On the machine, viruses may deposit a payload, which performs some or no operation. Frequently, this payload includes a trojan or keylogger.

Malicious code, such as trojans, keyloggers, worms and viruses, can be used by evil hackers to disrupt the normal operation of the innocent victim's computer, to spy on the innocent victim, to steal money from the innocent victim, or to steal intellectual property from the innocent victim. The evil hacker often uses the innocent victim's computer to perform these malicious activities, in order to harm the innocent victim's associated organization (e.g., company or government). Accordingly, such malicious code can harm a computer system, irrespective of whether the computer system belongs to an individual or an organization.

For example, a user operates an information handling system ("client machine"), which executes an Internet browser software program (or "browser"). By suitably operating the browser, the user navigates to an Internet portal of a web site that is hosted by an entity's server. In that manner, multiple users may simultaneously access the web site's Internet portal. By operating another information handling system that is coupled to the Internet, a hacker may infect the user's client machine with malicious code.

In one example, the web site hosts an online transaction, and the user logs into the web site to conduct the online transaction. In the course of a login procedure, the web site authenticates the user (e.g., by verifying the user's identity, such as by asking the user to provide a user name and confidential password). For transactions involving a financial payment, the financial web site may ask the user to provide sensitive financial information (e.g., a financial account number, such as a credit card account number). Or, even if the user does not provide financial information, such financial information may be output from the web site's server to the user's client machine. If the hacker has infected the user's client machine with malicious code, the user incurs a risk of the hacker exploiting the malicious code to perform online theft (e.g., by viewing, capturing or otherwise obtaining the user name, password and/or financial information), in which the user is a victim.

For example, with such information, the hacker is equipped to log into the web site from either the victim's client machine or from another information handling system, in order to perform additional online theft (e.g., transfer funds from the victim's financial account to the hacker's financial account, or use the victim's credit card information for purchases and cash advances). Such online theft is potentially difficult to detect, because it shares attributes of a valid transaction.

Some malicious code is exploitable by the hacker to perform online theft by remotely controlling the victim's client machine during the online transaction, so that the hacker gains control of the transaction's online session. With control of the session, the hacker is equipped to perform one or more online transactions to the victim's detriment.

In the illustrative embodiment, a software program for enhancing security in an online transaction (e.g., program for detecting malicious code) is installed on the user's client machine before initiating the online transaction. In that manner, the transaction's parties (e.g., the user, or the financial web site's operating entity) have more assurance that the online transaction is conducted in a secure manner. Accordingly, such a technique lowers the parties' risk of online theft.

Referring again to FIG. 1, information handling system 10 includes one or more of: a central processing unit (CPU) 12, memory 14, input/output (I/O) devices, such as a display, a keyboard, a mouse, and associated controllers, collectively designated by a reference numeral 16, a hard disk drive 18, or other storage devices or media drives, such as a floppy disk drive, a CD-ROM drive, a DVD drive, and memory device, collectively designated by a reference numeral 20, and/or various other subsystems, such as a network interface card, or wireless communication link ( collectively designated by a reference numeral 22), all interconnected, for example, via one or more buses (shown collectively as a bus 24). Examples of information handling systems are a personal computer system, a personal digital assistant, a thin client device, a thick client device, or similar information handling device.

In one embodiment, the information handling system ("IHS") 10 is configured with a suitable operating system for installing and executing instructions from one or more computer readable media 26, such as a hard disk drive, floppy diskette, CD-ROM, DVD, or memory. The information handling system 10 may further be configured for communicating with another information handling system 28 (e.g., through a network 30 via a suitable communication link or links). The operating system of IHS 10 may optionally include instructions for installing and executing programs, and for downloading information via network 30. The illustrative embodiments of the present disclosure may be practiced over an intranet, the Internet, virtual private network, or other suitable communication network.

According to one embodiment, the online security technique is implemented in the form of computer software program (e.g., including instructions executable by the CPU of a computer system, such as an innocent victim's computer system) for causing the computer system to perform various operations as described herein. Accordingly, in the illustrative embodiment, the online security technique includes a program for detecting malicious code (e.g., trojan) on a target computer system, such as an innocent victim's computer system. For some forms of malicious code, such as keyloggers and viruses, all of the malicious code resides on the innocent victim's computer system. For other forms of malicious code, such as, trojans and remote controls, only the server portion of the malicious code resides on the innocent victim's computer system. The malicious code detection program detects the presence of (and identifies) the malicious code before, during and/or after the malicious code executes on the victim's computer system.

Figure 2:
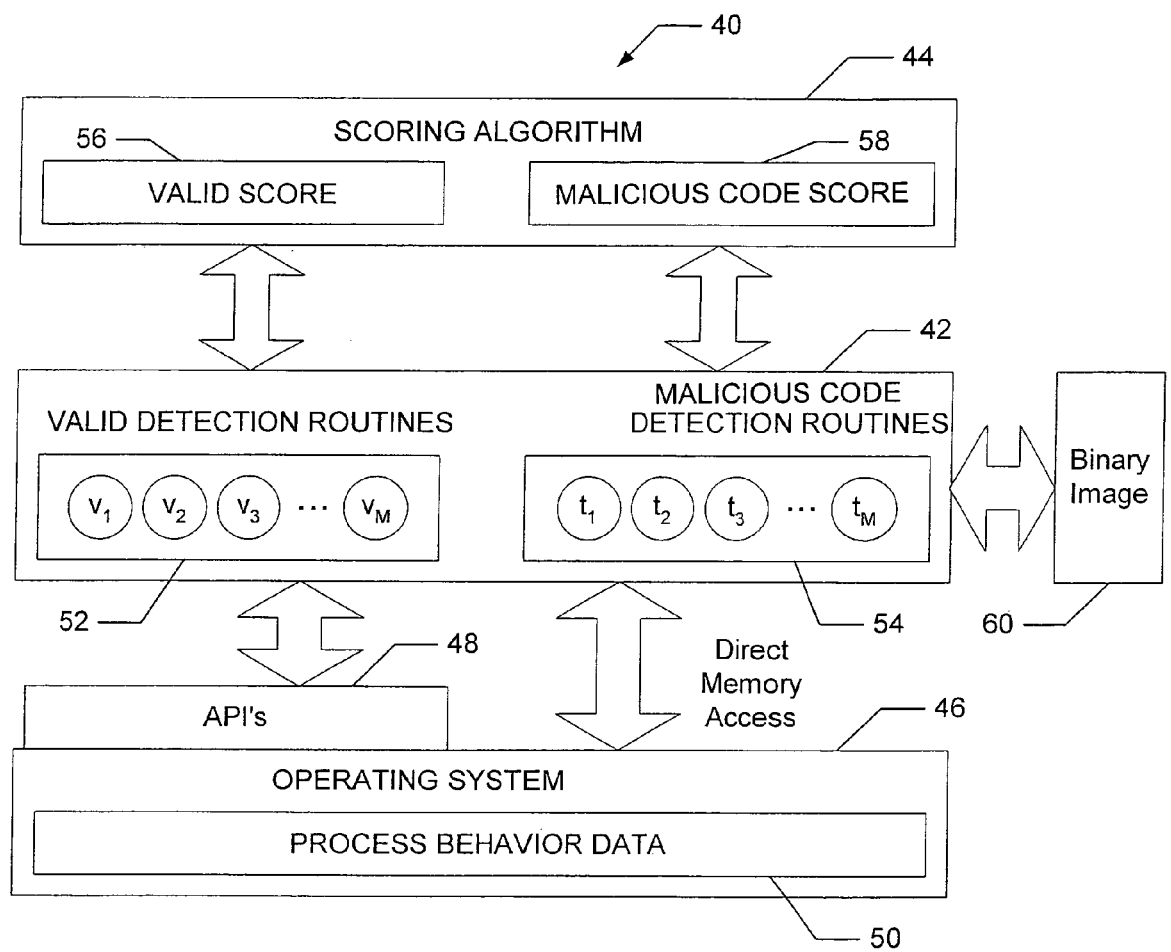
FIG. 2 is a process diagram of a detection architecture of malicious code detection program according to one embodiment of the present disclosure.

FIG. 2 illustrates an architecture of a malicious code detection program 40 that is executed by the information handling system 10 according to an embodiment of the present disclosure. The malicious code detection program 40 includes detection routines 42 and a scoring algorithm 44. The detection routines 42 operatively couple to an operating system 46 of the computer system under investigation via application programming interfaces (APIs) 48. The detection routines also access process behavior information (e.g., data) 50 and binary image information 60, according to the particular requirements of an associated detection routine, further as discussed below.

In one embodiment, the malicious code detection program operates as follows. The malicious code detection program executes at any time, on an as-needed basis, a periodic basis, a random basis, another scheduled basis, or on an event driven basis in response to a particular event according to the particular requirements of a given situation. In the illustrative embodiments, the malicious code detection program includes instructions for the information handling system to examine characteristics and behaviors of the information handling system's instructions and/or data.

The malicious code detection program includes instructions for the information handling system to evaluate the information handling system's instructions and/or data to determine whether such instructions and/or data are valid code (e.g., non-malicious) or malicious code of any one or more types. The malicious code detection program includes respective detection routines, sets of weights, and weighted scoring algorithms for detecting one or more types of valid code and/or one or more types of malicious code.

The malicious code detection program 40 includes detection routines 42, including valid program detection routines 52 and malicious code detection routines 54. The valid program detection routines 52 include one or more routines identified by v1, v2, v3, . . . vM in FIG. 2. The valid program detection routines 52 are configured to determine whether the program under investigation has characteristics and behaviors usually associated with a valid program. The malicious code detection routines 54 include one or more routines identified by t1, t2, t3, . . . , tN in FIG. 2. The malicious code detection routines 54 are for determining whether instructions and/or data under investigation have characteristics and behaviors usually associated with a malicious code program.

In one embodiment, the valid program detection routines 52 and the malicious code detection routines 54 gather a variety of characteristic and behavior information from the information handling system in a variety of ways, such as (a) examining the program itself; (b) accessing information from the operating system 46 using application programming interfaces (APIs) 48 to the operating system (including documented APIs and/or undocumented API's); (c) kernel and /or device driver interfacing; and/or (d) direct access to resources of the information handling system such as memory, network connections, storage media, and/or other devices. For example, as shown in FIG. 2, the detection routines 42 gather such information by examining one or more of (a) a binary image 60 or (b) a library or other information (e.g., tables showing a program's network connection activity) that indicates the aforementioned characteristics and behaviors, such as process behavior information 50.

For example, a detection routine 42 can be configured to account for the following. Many trojans, keyloggers, remote controls and monitoring software programs log keystrokes on the innocent victim's computer and transmit the keystroke information from the innocent victim's computer to the evil hacker's computer. In one embodiment, a malicious code detection routine 54 determines whether or the program being examined is logging keystrokes. Since there are many different ways for a program to log keystrokes, one or more of the malicious code detection routines 54 examines the program under investigation to determine whether the program is using any of a number of different techniques for logging keystrokes. Detection routines may output many different types of results, such as numeric values, boolean values, counts or lists.

The malicious code detection program 40 further includes a scoring algorithm 44. In the illustrative embodiment, the scoring algorithm calculates two scores, namely a valid program score 56 and a malicious code score 58. In an alternative embodiment, the scoring algorithm calculates the valid program score 56, but not the malicious code score 58. In another alternative embodiment, the scoring algorithm calculates the malicious code score 58, but not the valid program score 56.

If the result of a valid program detection routine 52 indicates that the characteristic or behavior of the program being examined was that of a valid program, then a weight, $W_i$, is associated with the routine and that weight contributes positively to the valid program score 56. A weight, $W_i$, is assigned to each valid program detection routine, for i=1 to M, where M is the number of valid program detection routines.

The weight indicates (a) the detection routine's importance, (b) the extent to which the particular behavioral trait being measured by the detection routine is present, and (c) the extent to which the behavioral trait contributes to the determination of whether the program is valid or malicious. To determine the value that results from combining the weight with the results of the detection routine, the information handling system performs any one or more of a variety of operations, such as performing an arithmetic or algebraic operation on the combination of the weight and the result of the detection routine or simply assigning the combination a numerical value.

If the result of a malicious code detection routine 54 indicates that the characteristic or behavior of the program being examined was that of a malicious code program, then a weight, $W_j$, is associated with the routine and that weight contributes positively to the malicious code score 58. A weight, $W_j$, is assigned each malicious code detection routine, for j=1 to N, where N is the number of malicious code detection routines.

According to one embodiment, the scoring algorithm 44 includes an algorithm that has an algebraic formula for determining the two scores 56 and 58. The scoring algorithm is dependent on the valid program detection routines 52 and the weights, $W_i$, associated with each valid program detection routine, in addition to, the malicious code detection routines 54 and the weights $W_j$, associated with each malicious code detection routine. The algebraic formula or equation can also be made arbitrarily complex (e.g., associating additional weights to one or more to combinations of detection routines 42).

In one embodiment, the scoring algorithm 44 includes an algebraic equation defined as a sum of weighted values. For example, the algebraic equation for the valid program detection routines can include an equation as given by:

$$\text{VALID SCORE} = \sum_{i=1}^{M} W_i,$$

where Wi=weight of a valid detection routine vi for i=1 to M.

Similarly, the algebraic equation for the malicious code detection routines can include an equation as given by:

$$\text{MALICIOUS CODE SCORE} = \sum_{j=1}^{N} W_j,$$

where Wj=weight of a malicious code detection routine tj for j=1 to N.

In another embodiment, more complex forms of the scoring algorithm 44 can be implemented in the form of more sophisticated algebraic formulae.

If a program under investigation exceeds a valid program score threshold, $V_{thres}$, then it is determined that the program is a valid program. If that program exceeds a malicious code score threshold, $T_{thres}$, then it is determined that the program is a malicious code program. If a program is deemed to be valid using the valid algorithm, then it is sometimes removed from consideration as a malicious code program.

Executable code and/or programs under investigation may also have some of the characteristics and behaviors of valid programs and some of the characteristics and behaviors of malicious code. If a program does not exceed either threshold or if a program does not have a significant difference between the valid program score 56 and the malicious code score 58, then according to another embodiment of the present disclosure, the technique identifies the program in another category of suspicious programs or anomalous programs.

In one embodiment, the technique for detecting malicious code on a computer system includes executing a malicious code detection program on the computer system. The malicious code detection program includes detection routines. The malicious code detection program applies the detection routines to programs on the computer system. The detection routines are assigned weights that are factored by a scoring algorithm to determine a composite score based on the results of the detection routines and their associated weights. For example, a malicious code detection routine has a weight associated with it, such that if the malicious code detection routine determines that a given code under investigation is a malicious code program, then the weight is applied positively towards the malicious code score for the code under investigation. Also, the malicious code detection program determines whether one or more programs are valid or malicious as a function of the weights assigned to the detection routines.

In another embodiment, the technique detects malicious code on a computer having an operating system. The technique includes executing a malicious code detection program on the computer. Detection routines of the malicious code detection program gather information about programs on the computer system. The detection routines include at least one of the following: (a) examining each executable code or program itself and (b) searching for information about each executable code or program in the operating system. For example, examining code or a program can include examining a binary image of the same, wherever the binary image may reside, within the IHS or in computer readable media accessible to the IHS. In addition, the detection routines further consist of valid program detection routines and malicious code detection routines.

The malicious code detection program applies the detection routines to the programs on the computer system. In response to a detection of a valid program or malicious code, the detection routines assigns weights to respective programs under test as a function of a respective detection routine. Also, the malicious code detection program determines whether a program is a valid program or malicious code as a function of the weights assigned by the detection routines. Determining whether the program is a valid program or malicious code involves the scoring of an execution of each detection routine as a function of a respective weight. A scoring algorithm is used to identify a program as malicious code in response to a valid score and a malicious code score, as discussed herein.

In yet another embodiment, the technique for detecting malicious code on a computer system includes executing detection routines, the detection routines having been configured to examine at least one selected from the group consisting of characteristics and behaviors of programs on the computer system. For example, the detection routines can be configured to access process behavior information of a program on the computer system. In addition, the characteristics and behaviors may include one or more of logging keystrokes, saving a display screen view, uploading files, downloading files, executing programs, and controlling a display screen of the computer system.

Subsequent to execution of one or more of the detection routines, weights are assigned as a function of the examined characteristics and behaviors, the assigned weights indicative of a valid program or malicious code as a function of respective detection routines. Also, the technique determines whether a program is malicious code as a function of the weights assigned by the detection routines.

In the embodiment of the previous paragraph, the detection routines include valid program detection routines and malicious code detection routines. The valid program detection routines are configured to determine whether the program exhibits at least one or more characteristics and behaviors associated with a valid program. The malicious code detection routines are configured to determine whether the program exhibits at least one or more characteristics and behaviors associated with malicious code.

In one embodiment, the technique for detecting malicious code is implemented in the form of a computer program. The computer program is executed on a desired computer system for detecting any potential malicious code on the computer system. Execution of the computer program continues until all active programs on the computer system have been tested and evaluated.

Alternatively, other criteria may be established for a duration of testing with the malicious code detection program. For example, execution of the malicious code detection program can be configured to occur in response to one or more of a random initiation and a periodic initiation.

According to another embodiment, the malicious code detection program includes a small program configured for being delivered quickly, as well as, for being executed quickly. The malicious code detection program can be delivered to the innocent victim's computer over a network, such as a Local Area Network (LAN), Wide Area Network (WAN), Internet, intranet, or any other global computer network 30. The malicious code detection program may also be delivered via suitable computer readable media, such as, media 26 shown in FIG. 1.

The technique of the present embodiments does not stop the computer is system from being initially infected with malicious code, but such technique identifies the malicious code infection when executing on a computer system. The technique for identifying a malicious code program is suitable for combination with other techniques, such as a technique for detecting infection, resulting in a more robust implementation of malicious code protection for a computer system.

Figure 3:
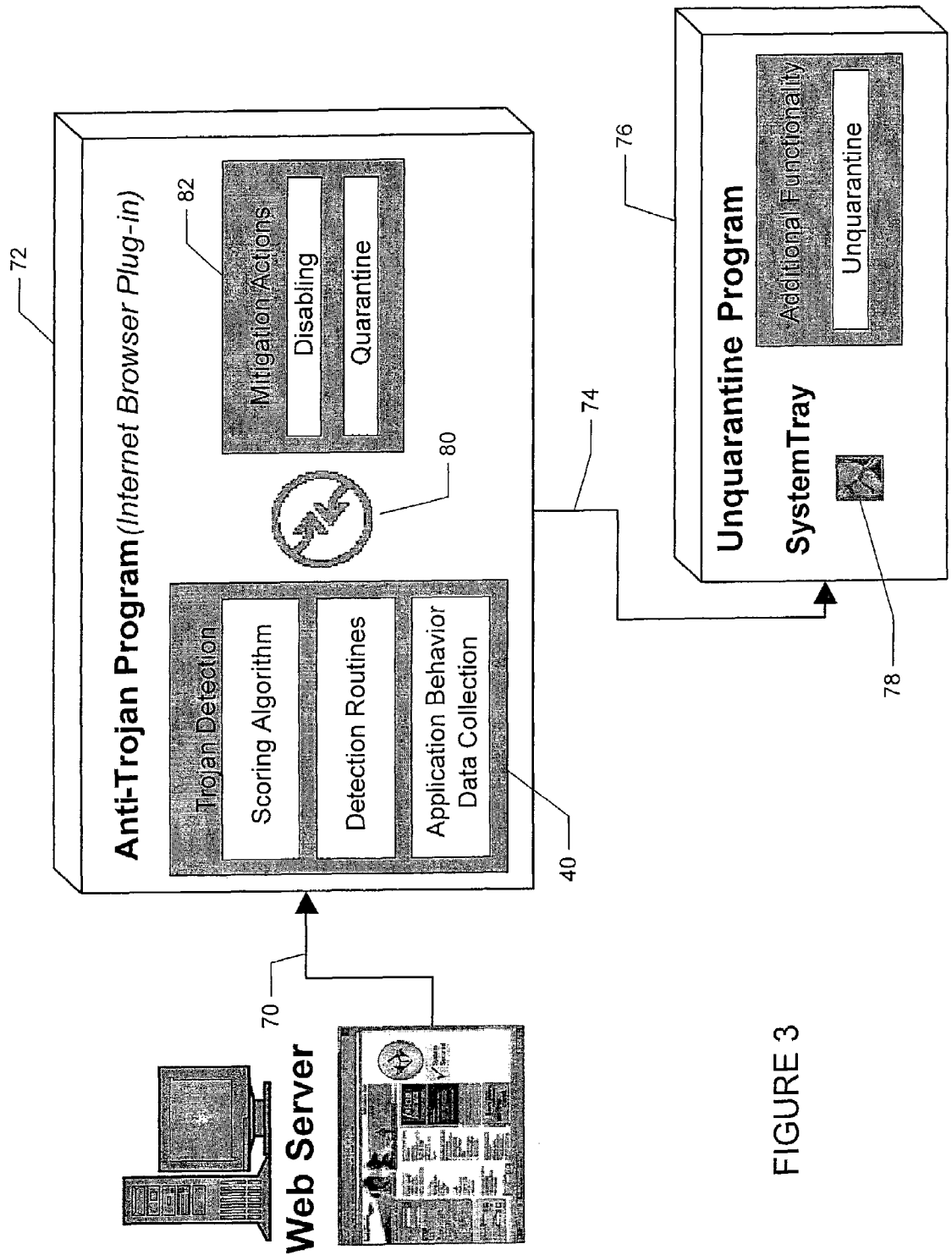
FIG. 3 is a process diagram for providing online security according to one embodiment of the present disclosure.

FIG. 3 is a process diagram of a system for providing online security, according to one embodiment of the present disclosure. According to the embodiment, one technique for providing online security protection includes downloading an anti-malicious code program from a web server to a user's information handling system. The anti-malicious code program includes a malicious code detection program having a scoring algorithm, detection routines, and application behavior information collection as discussed hereinabove. The anti-malicious code program further includes a program for performing mitigation actions and an unquarantine program.

The mitigation actions include at least one of disabling and quarantining the malicious code detected by the malicious code detection program, according to (and in response to) an indication received from a user (via the information handling system that is operated by the user). The program asks (e.g., prompts) the user to provide such indication. In providing such indication, the user may select non-mitigation, so that the detected malicious code is not mitigated. In response to the user's indication being non-mitigation, the user's information handling system saves the indication for a subsequent operation of the anti-malicious code program, so that the program (according to a specified preference of either the user or company X) either: (a) reminds the user about the indication if the program subsequently detects the same malicious code; or (b) subsequently ignores the same malicious code without reminding the user.

If the anti-malicious code program reminds the user about the indication, or if the user otherwise views a stored record of the indication, then the user is able to selectively command the program to reverse the indication, so that the program subsequently detects the same malicious code. Likewise, the anti-malicious code program stores a record of a previous disabling or quarantining of malicious code that was detected by the program. Accordingly, the unquarantine program provides additional functionality for reversing the previous disabling or quarantining, according to (and in response to) an indication received from the user. The program asks the user to provide such indication.

For clarity, the following discussion references an "anti-trojan program" as performing the online security functions, and references a trojan as being the malicious code, respectively, although the discussion likewise applies generally to other types of anti-malicious programs (e.g., "anti-worm program" or "anti-spyware program") and other types of malicious code (e.g., worm or spyware).

As shown in FIG. 3, at a process 70, an anti-trojan program 72 is downloaded from a host information handling system (e.g., IHS 10 of FIG. 1), which operates a web site that hosts the anti-trojan program 72, to a user's information handling system (e.g., IHS 28 of FIG. 1). In one embodiment, the anti-trojan program 72 includes a plug-in. After the initial download, the plug-in is cached and executes in association with a browser on the user's system. At a process 74, the plug-in installs an unquarantine program 76 on the user's system and adds a system tray icon 78. At a process 80, the plug-in 74 executes detection routines and in response to detecting a trojan, performs one or more mitigation operations/functions/actions 82.

According to another embodiment, the online security protection technique includes protecting users of online transactions from identity theft and fraud via malicious code (e.g., trojan) detection technology.

According to yet another embodiment, the technique for providing online security includes distributing a security technology configured to protect an online user, in response to the user's accessing a web site, on which the online user is about to perform a transaction that may benefit from a higher level of security.

In another embodiment, the technique for providing online security provides for distribution of a security technology including technology for detection of malicious code. The technique is also applicable to future security products (e.g., firewall or detection product for other forms of malicious code) that may be distributed in a similar manner.

The technique of the present embodiments provides protection for a user of an online transaction from malicious code and, accordingly, provides protection against an online theft exploiting malicious code. According to one embodiment, the technique protects an innocent victim by detecting and removing malicious code at a point of entry into the online transaction (e.g., online financial transaction). By detecting and removing the malicious code at the point of entry into the online transaction, such as a login sequence to an online bank web site, the innocent victim is more secure from a hacker (e.g., who may attempt to exploit malicious code for remotely controlling the victim's system).

Also, the technique includes suggested measures for organizing an online banking session, so that an online banking customer user can ensure that the user's identification information, such as user name and password, are secure, even if malicious code was active at the time of the login to the online banking session. In one embodiment, the technique for providing online transaction security employs an anti-malicious code program. The malicious code program is activated immediately prior to or after the login sequence. If execution of the anti-malicious code program is initiated immediately prior to the login sequence, then the malicious code can be removed before the user's identification information is otherwise compromised during the login sequence. If the anti-malicious code program is activated immediately after the login sequence, then the malicious code can be removed after the user's identification information user name and password has been compromised, but the user can be prompted to change such information. Accordingly, the technique reduces the period of time during which security may be compromised and protects the user from an evil hacker who may have just captured the user's identification information.

According to another embodiment of the present disclosure, the technique for providing online security in an online transaction (e.g., online financial transaction) does not require that the anti-malicious code program is executed at the point of entry into the online web site. Instead, the online security measures can be executed at any point during the online transaction session. Furthermore, it is sometimes desirable to execute the anti-malicious code program repeatedly during the duration of the online transaction session. Executing the anti-malicious code program repeatedly during the duration of the online transaction session guards against a malicious code infection that could occur after the login sequence and before the end of the session. Executing the anti-malicious code program repeatedly or even substantially continuously reduces the probability of a malicious code infection.

An online financial transaction may include one or more operations associated with the online financial transaction, such as inquiries (e.g., regarding account balance or transactions), payments, and transfers. Accordingly, the illustrative embodiments include the ability to execute the anti-malicious code program repeatedly or continuously during a session. The anti-malicious code program may be executed continuously by launching the program in response to an event. One embodiment of the present disclosure provides for launching the anti-malicious code program in response to the innocent victim's system executing a new program. By triggering the launch of the anti-malicious code program on a new process being started, the anti-malicious code program is able to detect any new malicious code that starts during the session.

In the following discussion, a technique for integrating online security into an online transaction procedure is described using an example company X. Company X hosts a web site for handling online transactions, such as online financial transactions. The process, which is as follows, is executed by Company X's web server and the user's information handling system.

1. Start at company X's online login page. Although starting at the company X's login page is a likely scenario, it is not a requirement. There are many techniques to determine whether a user is a customer of company X other than waiting for the user to login with a valid identification information (e.g., user name and password). For example, in one version of the technique, a cookie is stored on the user's information handling system and is checked via an anti-malicious code plug-in to validate (e.g., authenticate) the user's information handling system. Accordingly, the session that is being described does not need to be started at the user's login page. Nevertheless, this is likely the most common way for the technology to be integrated into a company X's web site.

2. User logs in. This assures that the anti-malicious code program is made available to only company X's authenticated online customers.

3. User is directed to the web page where the anti-malicious program is hosted.

4. At this point, the institution can choose an opt-in/opt-out model or they can force the user into the security procedure. The opt-in/opt-out model gives the user the choice to either (a) accept the anti-malicious code program, thereby "opting-in," or (b) instead, to refuse to accept the download of the anti-malicious code program, thereby "opting-out." In the opt-in/opt-out model, the user is presented with a displayed prompt, which asks the user to accept or reject the anti-malicious code program. Examples of such prompts are: "Do you trust content from 'Company X'" and "Do you want to install and run Y". In response to such a prompt, the user clicks either "OK" or "Cancel."

a. if OK, then go to next step 5
   b. if Cancel, then (depending on the company X's policy) either:
      (1) skip the download and redirect the user to a page on the online financial company X's web site that normally follows the login page;
      (2) force the user to download the plug-in, in order to proceed with the session (i.e., go to step 5); or
      (3) prohibit the user from entering the portion of the web site that enables the user to perform the transaction.

If company X has chosen to force the user to run the anti-malicious code program, then the user is not prompted to make a choice. Instead, the user is simply forced to go to the next step 5.

5. The user's information handling system downloads the anti-malicious code program from Company X's web server. In one embodiment, the program is specific to a particular operating system and a specific Internet browser of the user's information handling system. Some operating systems and browsers an execute the same version of the program, but other operating systems and browsers need a version that is specific to them. According to another embodiment, the download is preceded by a separate download (from Company X's web server) of a program that identifies the operating system and the type of Internet browser being used on the user's information handling system, so that Company X's web server can initiate a download (to the user's information handling system) of the correct version of the anti-malicious code program.

6. Company X's web server initiates the download (to the user's information handling system) of the anti-malicious code program in a manner that initiates execution of the program after the download is finished. At some point during the execution, the anti-malicious code program installs a resident program on the innocent victim's system and optionally a shortcut (e.g., a system tray icon on a system that executes a Microsoft Windows® operating system ("OS")), so that the user can invoke the resident program at a later time. The resident program and its purpose are further described hereinbelow. When the anti-malicious code program executes, the program detects malicious code on the user's system. The program is configurable in any of several ways, such as the following.

a. If no malicious code is detected, then the user is redirected to a web page that allows the user to proceed normally with the online transaction session.
   b. If malicious code is detected, then a procedure is followed, according to a security protection policy of the company X, such as one of the following.
      (1) The malicious code is detected, but not mitigated, in which event:
         (a) the user is notified that the malicious code was discovered; and
         (b) the user's online transaction session is terminated, so that the user is disallowed from continuing with the session, because the session may have been compromised.
      (2) The malicious code is detected and also mitigated by disabling, so that it is stopped, and the user's online transaction session continues. Accordingly, such disabling stops execution of the malicious code on the user's information handling system during the session. Such disabling of the code is a useful technique, if the user wants to continue storing the code on the user's information handling system. An example of such code is Symantec pcAnywhere®, which is a legitimate remote system administration tool. Despite such code's legitimacy, company X's policy can prohibit execution of such code during the online transaction session, and yet permit the user's information handling system to continue storing such code for future execution.
      (3) The malicious code is detected and also mitigated by disabling and quarantining, so that it is identified, moved and/or marked on the disk drive of the user's information handling system, in a manner that prohibits restarting (e.g., respawning) execution of the malicious code. In one embodiment, all vestiges of the malicious code are erased from the user's information handling system (e.g., including Microsoft® registry entries and associated files).

7. After completing execution of the anti-malicious code program, the user is notified of a status of the detection operation (or "scan"), such as a notification that no malicious code was found or that malicious code was detected and mitigated.

8. According to the security protection policy of the company X, an additional procedure is followed, such as one of the following.
   a. The anti-malicious code program redirects the user to a web page that allows the user to proceed with the online transaction.
   b. If malicious code was detected, the anti-malicious code program prevents the user from proceeding with the online transaction. In one embodiment, the program causes the user to be "logged out" of company X's web server and/or asks the user to contact company X's customer support department.
   c. If malicious code was detected after the user "logged into" company X's web server, the anti-malicious code program redirects the user to a web page that either requires or encourages the user to change its password and/or user name, because confidentiality of the existing password and/or user name is potentially compromised by the malicious code that was detected.

9. On the user's information handling system, the anti-malicious code program installs a resident program for selectively reversing a disablement or reversing a quarantine, in response to a command from the user. In that manner, the disablement or quarantine is reversed, and the previously disabled or quarantined code is restored to its original location on the disk drive of the user's information handling system. Moreover, the resident program is suitable for performing additional operations, such as providing help or additional information about the detected malicious code or a support organization. A user may wish to perform such a reversal of a disablement or quarantine for various reasons, including any of the following reasons.
   a. If the anti-malicious code program mistakenly detected a valid application as malicious code (e.g., resulting in automatic disablement or quarantine of such application), then the user may want to restore such application by reversing such disablement or quarantine. For example, the disablement or quarantine may interfere with a communication between the user's information handling system and a network (e.g., if such communication is subject to execution of the valid application). The resident program, which performs such reversal, is executable independent of such communication, so that such reversal is possible even in the absence of such communication, and so that such communication is accordingly restorable.
   b. If the anti-malicious code program detected legitimate malicious code (e.g., resulting in automatic disablement or quarantine of such code), then the user may want to restore such code by reversing such disablement or quarantine. For example, such code may be a legitimate remote system administration tool, such as Symantec pcAnywhere®.

According to one embodiment, the technique for providing online security protection includes distributing a security product (e.g., the anti-malicious code program), which is suitably packaged and delivered to an online user's information handling system. In one example, the anti-malicious code program is packaged as a web browser plug-in.

Various Internet browsers are available for accessing the Internet from a computer system, such as Microsoft's Internet Explorer® ("IE") browser, Netscape's Netscape® browser and America Online's AOL® browser. These browsers are suitable for operation with plug-ins, in order to enhance such operation. The plug-ins are packaged in a manner that accommodates specifications for a particular browser.

In response to a browser (of a user's information handling system) accessing a web site that stores (e.g., hosts) the plug-in, the web site's server (e.g., web server) downloads the plug-in to the user's information handling system. In response to such downloading, the plug-in is added to the browser, in order to enhance the browser's online security features. Microsoft's Internet Explorer® browser implements plug-ins as ActiveX controls. The Netscape® browser refers to plug-ins as Netscape plug-ins. The AOL® browser implements plug-ins as either ActiveX controls (for older versions of the browser) or as Netscape plug-ins (for newer versions of the browser).

Plug-ins are designed for downloading in response to a browser (of the user's information handling system) accessing a particular web page. With ActiveX controls, the user interacts with a single dialog window to accept and install the plug-in. With Netscape plug-ins, the user interacts with one or more dialog windows to accept and install the plug-ins, according to various installation routines. For both ActiveX controls and Netscape plug-ins, after a plug-in is downloaded and installed, caching of the plug-in (on the user's information handling system) is automatically initiated, and the cached plug-in is activated whenever the user visits a particular web site (e.g., whenever the user returns to the web site from which the plug-in was downloaded).

According to one embodiment of the present disclosure, the technique of providing online security includes directing a user to a web page at a suitable moment before or during an online financial transaction. From such web page, the security product (e.g., anti-malicious code program's plug-in) is downloaded and installed. After such download and installation, the security product is executable on the user's information handling system (e.g., periodically, continuously, or a combination thereof).

According to one embodiment of the present disclosure, when the plug-in's execution is initiated, the plug-in (which includes the anti-malicious code program) is automatically examined by the computer system to verify that the plug-in has not been altered. In that manner, the computer system automatically guards against a situation in which the malicious code attempts to defend itself by altering the plug-in. Various techniques exist for determining whether the plug-in has been altered, such as comparing the plug-in's file size to a predetermined value.

The anti-malicious code program is executable before a login procedure of the online transaction (e.g., financial transaction, such as a bank transaction). Such execution protects a user's information handling system during a general Internet browsing session, even if the user has not logged into a particular web site. The login procedure (which asks the user to specify a confidential password and user name) authenticates the user's permission to access a particular web site. Moreover, aside from the login procedure, other techniques exist for determining whether a user's information handling system is authorized to access the particular web site, such as checking for cookies that are stored on the user's information handling system. Accordingly, a specific web page (on which the anti-malicious code program's plug-in is hosted), and the time period (e.g., of the login sequence) when the plug-in is downloaded, are subject to a policy of the company X (which hosts the online transaction). By developing a specific procedure for the company X, such as discussed hereinbelow, the company X (e.g., a financial institution) attempts to protect its customers when they visit company X's web site. In that manner, the company X provides a service that has enhanced value.

In another embodiment of the present disclosure, the anti-malicious code program is executable independent of an Internet browser, so that it is executed from either the main memory or a cache memory of the user's information handling system (e.g., if copied into the cache memory by an operating system software of the user's information handling system).

Benefits of the present disclosure's technique include single-click security, universal compliance, and continual reassurance. For example, many conventional security products rely on a significant amount of user interaction and user knowledge. By comparison, the present disclosure's technique is less reliant on user interaction and/or user knowledge. This technique streamlines user interaction by providing a single "click" operation, such as by asking a user once (e.g., during an online transaction session) if the user approves downloading and installation of the anti-malicious code program. After receipt of such approval, with the present disclosure's technique, the program operates with comparatively less intervention from the user.

Also, many conventional security software products are subject to being manually installed and updated periodically by the user. By comparison, the online security product of the present disclosure is automatically distributed from company X's web site and installed (subject to the user's approval) on the user's information handling system before, during and/or after an online transaction session. In that manner, multiple users of company X's web site are readily protected.

Moreover, in one embodiment of the present disclosure, users are periodically and/or continually reminded (e.g., via on-screen display of a security emblem or other suitable icon on a display device of the user's information handling system) that they are being protected by the online transaction security product of the present disclosure. Accordingly, the technique continually reassures users in a manner that provides a marketing advantage over other non-protected online transaction providers.

Where the foregoing disclosure mentions that code performs an operation, it is understood that the information handling system performs the operation in response to the information handling system's execution of the code.

Although illustrative embodiments have been shown and described, a wide range of modification, change and substitution is contemplated in the foregoing disclosure and, in some instances, some features of the embodiments may be employed without a corresponding use of other features. Accordingly, all such modifications are intended to be included within the scope of the embodiments. Accordingly, it is appropriate that the appended claims be construed broadly. In the claims, means-plus-function clauses are intended to cover the structures described herein as performing the recited function and not only structural equivalents, but also equivalent structures.

What is claimed is:

1. A method, comprising:
   receiving a first request via a browser application running on a first client computer system, wherein said first request is for a first website usable by said first client computer system for performing an online transaction;
   subsequent to said first request and prior to completion of the online transaction, sending a first program to said first client computer system, wherein said sending causes the first program to automatically execute repeatedly within said browser application during the online transaction in order to determine whether malicious code is currently running on said first client computer system;
   wherein, if the execution of the first program indicates that malicious code is currently running on the first client computer system, perform a corrective action with respect to the malicious code.

2. The method of claim 1, wherein the first program is executable on said first client computer system as a plug-in for said browser application.

3. The method of claim 1, wherein the first website is an online banking website, and the online transaction is a banking transaction.

4. The method of claim 1, wherein the corrective action includes disabling or quarantining malicious code currently running on the first client computer system.

5. The method of claim 1, wherein the first program is executable to examine characteristics and behaviors of each of the programs currently running on the first client computer system.

6. The method of claim 1, wherein the first program is automatically executable within said browser application at a point of entry into the online transaction, wherein the point of entry is prior to entry of a login sequence to the first website.

7. The method of claim 1, wherein the first program is automatically executable within said browser application at a point of entry into the online transaction, wherein the point of entry is immediately after entry of a login sequence to the first website.

8. The method of claim 1, wherein the corrective action includes terminating the online transaction.

9. The method of claim 1, wherein the corrective action includes disabling the malicious code.

10. A computer system, comprising:
    a processor subsystem; and
    a memory, including program instructions executable by said processor subsystem to:
    receive a first request via a browser application running on a first client computer system, wherein said first request is for a first website usable by said first client computer system for performing an online transaction;
    subsequent to said first request and prior to completion of the online transaction, send a first program to said first client computer system, causing said first program to automatically execute repeatedly within said browser application during the online transaction in order to determine whether malicious code is currently running on said first client computer system;
    wherein, if the execution of the first program indicates that malicious code is currently running on the first client computer system, perform a corrective action with respect to the malicious code.

11. The computer system of claim 10, wherein said online transaction includes performing an authentication of a user of the first client computer system.

12. The computer system of claim 10, wherein the online transaction includes the exchange of personal information that includes personal financial information.

13. The computer system of claim 12, wherein the online transaction includes the exchange of personal financial information that includes at least one of the following types of information: credit card information; account balance information; financial transaction history information.

14. The computer system of claim 10, wherein the first program is executable on said first client computer system as a plug-in for said browser application.

15. The computer system of claim 10, wherein the first website is an online banking website, and wherein the online transaction is an online banking transaction.

16. The computer system of claim 10, wherein the first program is executable to disable a second program currently running on the first client computer system, wherein the second program is only disabled until the online transaction is completed.

17. The computer system of claim 10, wherein the first program is executable to search for characteristics and behaviors of currently running programs on the first client computer system, including characteristics and behaviors typically associated with both malicious code and valid code.

18. The computer system of claim 10, wherein said first program is automatically executable within said browser application at a point of entry into the online transaction, wherein the point of entry is immediately after entry of a login sequence to the first website.

19. The computer system of claim 10, wherein said first program is automatically executable within said browser application at a point of entry into the online transaction, wherein the point of entry is prior to entry of a login sequence to the first website.

20. The computer system of claim 10, wherein the corrective action includes terminating the online transaction.

21. The computer system of claim 10, wherein the corrective action includes disabling the malicious code.

22. A computer-readable memory medium, including program instructions executable to:
  receive a first request via a browser application running on a first client computer system, wherein said first request is for a first website usable by said first client computer system for performing an online transaction;
  subsequent to said first request and prior to completion of the online transaction, send a first program to said first client computer system, causing said first program to automatically execute repeatedly within said browser application during the online transaction in order to determine whether malicious code is currently running on said first client computer system;
  wherein, if the execution of the first program indicates that malicious code is currently running on the first client computer system, perform a corrective action with respect to the malicious code.

23. The memory medium of claim 22, wherein the first program is executable on said first client computer system as a plug-in for said browser application.

24. The memory medium of claim 22, wherein the first website is an online banking website, and wherein the online transaction is an online banking transaction.

25. The memory medium of claim 22, wherein the first program is executable to quarantine a second program currently running on the first client computer system and to unquarantine the second program in response to user input received via the first client computer system.

26. The memory medium of claim 22, wherein the first program is executable to perform, for each of one or more programs currently running on the first client computer system, a plurality of detection routines and to categorize each of those programs with respect to the likelihood that the program will compromise the security of the online transaction;
  wherein each of the one or more programs is running on the first client computer system in a manner that permits that program to directly interface with an operating system of the first client computer system.

27. The memory medium of claim 22, wherein said first program is automatically executable within said browser application at a point of entry into the online transaction, wherein the point of entry is prior to entry of a login sequence to the first website.

28. The memory medium of claim 22, wherein said first program is automatically executable within said browser application at a point of entry into the online transaction, wherein the point of entry is immediately after entry of a login sequence to the first website.

29. The memory medium of claim 22, wherein the corrective action includes terminating the online transaction.

30. The memory medium of claim 22, wherein the corrective action includes disabling the malicious code.

31. A system, comprising:
  a server hosting a first website that is usable by various client computer systems for performing online transactions;
  a first client computer system storing program instructions executable to send a request, via a browser application, to the first website to perform a first online transaction;
  wherein the sewer stores program instructions executable to send, subsequent to the request, a first program to the first client computer system, wherein the first program is repeatedly executable on the first client computer system prior to completion of the first online transaction to determine whether malicious code is currently running on the first client computer system;
  wherein, if the execution of the first program indicates that malicious code is currently running on the first client computer system, perform a corrective action.

32. The system of claim 31, wherein the first website is an online banking website, and wherein the first online transaction is an online banking transaction.

33. The system of claim 31, wherein the first program is executable to categorize a second program running on the first client computer system as malicious code, wherein the second program is running in a manner that permits the second program to compromise the security of the first online transaction.

34. The system of claim 33, wherein the first program is executable to categorize the second program by calculating a first score and a second score indicative of the extent to which the second program has characteristics and behaviors typically associated with malicious code and valid code, respectively.

35. The system of claim 31, wherein the first program is executable on the first client computer system prior to or immediately after entry of a login sequence by a user of the first client computer system.

36. The system of claim 31, wherein the first program is executable on the first client computer system as a browser plug-in.

* * * * *